(12) United States Patent
Ederle et al.

(10) Patent No.: US 7,183,001 B1
(45) Date of Patent: Feb. 27, 2007

(54) TRANSPARENT THERMOPLASTIC COMPOSITION COMPRISING HOLLOW GLASS BEADS

(75) Inventors: Yannick Ederle, Billère (FR); Jean-Michel Bruneau, Gisors (FR)

(73) Assignee: Arkema France, Puteaux (FR)

( * ) Notice: Subject to any disclaimer, the term of this patent is extended or adjusted under 35 U.S.C. 154(b) by 129 days.

(21) Appl. No.: 10/505,598

(22) PCT Filed: Feb. 18, 2003

(86) PCT No.: PCT/FR03/00524

§ 371 (c)(1),
(2), (4) Date: Aug. 23, 2004

(87) PCT Pub. No.: WO03/072645

PCT Pub. Date: Sep. 4, 2003

(30) Foreign Application Priority Data

Feb. 28, 2002 (FR) .................... 02 02557

(51) Int. Cl.
*B32B 5/16* (2006.01)
*C08G 63/00* (2006.01)

(52) U.S. Cl. ............ 428/327; 428/218; 528/176; 528/196; 528/272; 524/520; 525/199

(58) Field of Classification Search ........... 428/327, 428/218; 524/520; 525/199; 528/272, 176, 528/196
See application file for complete search history.

(56) References Cited

U.S. PATENT DOCUMENTS

| 4,192,576 A | 3/1980 | Tung et al. |
| 4,348,312 A | 9/1982 | Tung |
| 5,744,534 A | 4/1998 | Ishiharada et al. |
| 6,107,444 A | 8/2000 | Bruneau et al. |
| 2003/0119990 A1 | 6/2003 | Bruneau et al. |

FOREIGN PATENT DOCUMENTS

| DE | 1585327 | | 5/1977 |
| GB | 1 585 327 | * | 5/1978 |
| GB | 1585327 | | 5/1978 |

* cited by examiner

*Primary Examiner*—Robert D. Harlan
(74) *Attorney, Agent, or Firm*—Thomas F. Roland

(57) ABSTRACT

Thermoplastic composition comprising a (meth)acrylic (co) polymer and particles of hollow glass spheres—or a mixture of particles of hollow glass spheres and particles of a mineral and/or organic compound—the said particles scattering light:
  having a mean size of 0.5 μm to 200 μm;
  possessing a refractive index different from that of the transparent thermoplastic by at least ±0.05; and
  being used in an amount of 5 ppm to 1000 ppm by weight with respect to the total composition.

Corresponding fashioned articles, especially sheets for backlight units.

21 Claims, 2 Drawing Sheets ness. They are also fragile, especially
TRANSPARENT THERMOPLASTIC COMPOSITION COMPRISING HOLLOW GLASS BEADS This application claims benefit, under U.S.C. §119 or §365 of French Application Number 02.02557, filed Feb. 28, 2002; and PCT/FR03/00524 filed Feb. 18, 2003.

FIELD OF THE INVENTION

The subject of the present invention is a composition made of a transparent plastic comprising particles of hollow glass spheres, which can be used to form fashioned articles, especially light-scattering sheets (or panels). These sheets are more particularly suitable for making up flat light screens intended for the display system of microcomputers, especially a liquid-crystal display system.

BACKGROUND OF THE INVENTION

Light-scattering sheets intended for the manufacture of microcomputer screens are known. Such a sheet consists, for example, of a transparent plastic, such as poly(methyl methacrylate) (PMMA), and is coated on one of its faces with dots of suitable size, printed by a technique such as screen printing.

During its use as a microcomputer display system, such a sheet, generally rectangular in shape, is illuminated by a light source, generally one or more fluorescent tubes placed near one or more of the edges of the panel (especially parallel to these edges), so as to illuminate it (or them) via the edge. The light rays emanating from the source are transmitted by the transparent material in the bulk of the sheet, which thus operates as a lightguide.

However, some of these rays are reflected and scattered by the printed dots, and may thus be observed from that side of the sheet which faces the user. It is these reflected and scattered rays which have the effect of making the sheet luminous.

In a microcomputer display system, such a scattering sheet is generally mounted at the rear of the liquid-crystal display device and thus makes the information displayed by the latter luminous. This scattering sheet, the associated light source(s), the frame in which the assembly is mounted and, possibly, accessory elements (such as films helping to make the scattered light more uniform, prismatic films and/or protective films) constitute a unit used in the field of assembling microcomputer flat screens, often called in the art "backlight unit", and it is this term which will be used in the present text.

It is important, for the purpose of visual comfort of the person using a microcomputer screen, to have not only a scattering sheet ensuring a very high level of illumination (of the order of 2000 lux), which assumes an appropriate efficiency in terms of light transmitted into the bulk of the sheet, but also an intensity of the light scattered towards the user which is uniform over the entire surface of the sheet.

In addition, according to a frequent configuration for a backlight unit, the scattering sheet is illuminated, for example by 2 fluorescent tubes placed parallel to the edges corresponding to the 2 opposed sides. In such a configuration, the scattered light intensity may exhibit a certain variation from one of these sides to the other, with a reduction in the central part of the sheet. It is desirable for the visual comfort of the user that the reduction in light intensity observed in the central part of the sheet be as limited as possible.

Scattering sheets provided with screen-printed dots have drawbacks arising from the difficulty of manufacturing them, this being accompanied by a high scrap rate of off-specification products. They are also fragile, especially because of problems of adhesion of the dots to the sheet or because of the possibility of scratching when handling the said sheets.

Also known are light-scattering panels that can be used for light display systems for advertising or information purposes. These display systems generally comprise, mounted in a suitable frame, an assembly comprising a sheet (or panel) made of a transparent plastic containing particles of material able to scatter light. These sheets may be illuminated by light sources placed near the edge(s).

Thus, U.S. Pat. No. 6,107,444 discloses a transparent plastic composition comprising polyamide particles, which can be used for light display systems. The levels of illumination allowed by such a system, of the order of a few hundred lux, are, however, not high enough to illuminate a microcomputer screen.

International Application U.S. 2003119990 discloses a composition made of a transparent plastic comprising polytetrafluoroethylene (PTFE) particles, which can be used especially for flat light screens. Although the PTFE particles allow plates with a certain thickness to obtain a high scattered light intensity, the latter suffers, however, an excessive reduction in the central part of the screen.

Japanese Application JP 50-002180 discloses a thermoplastic resin composition obtained by polymerization of a monomer deriving from methyl methacrylate, which comprises from 0.2 to 20% by weight of glass particles. This composition is used to prepare a moulded product by stretching a cast sheet, the said product affording, owing to its surface roughness, advantageous optical properties beneficially used in the construction of a skylight.

SUMMARY OF THE INVENTION

It is an object of the present invention to improve the optical properties of fashioned light-scattering articles, and especially those of the sheets required by backlight units intended for assembling the flat screens of microcomputers. Thus the object of the application is to guarantee a high scattered light intensity, while maintaining uniformity of this intensity over the entire surface of the sheet, and especially over its central part.

For this purpose, the subject of the invention is a thermoplastic composition for fashioned light-scattering articles based, on the one hand, on a transparent thermoplastic made from a (meth)acrylic (co)polymer and, on the other hand, on light-scattering particles, the said composition being characterized in that it comprises, as light-scattering particles, particles of hollow glass spheres—or a mixture of particles of hollow glass spheres and particles of a mineral and/or organic compound—the said particles scattering light:

having a mean size of 0.5 µm to 200 µm;

possessing a refractive index different from that of the transparent thermoplastic by at least ±0.05; and being used in an amount of 5 ppm to 1000 ppm by weight with respect to the total composition.

BRIEF DESCRIPTION OF THE DRAWINGS

FIG. 1 illustrates one embodiment of the backlight unit according to the invention, seen from above. A light-scattering sheet (1) according to the invention is illuminated by two fluorescent tubes (2) mounted in a white plastic frame (3), so as to illuminate the sheet via two of its opposed sides (or edges) (4). Advantageously, these edges (4) facing the fluorescent tubes are polished beforehand in order to avoid reflection of the emitted light. The face (A) of the sheet (1) is that via which the light is scattered, for example towards a liquid-crystal display device. To obtain better reflection of the light before it is scattered by the sheet (1), the face (B) of the sheet, on the opposite side from that via which the light is scattered, advantageously carries an opaque sheet or film (5) formed by any suitable material, for example by polymethyl methacrylate treated so as to have a low transmission (such as ALTUGLAS, Ref. 101.47005), a white vinyl chloride polymer, a white polyester or a polyethylene.

FIG. 2 shows the distribution of the light intensity (in lux) scattered by sheets prepared in accordance with Examples 1 to 5 described below and tested in accordance with the test protocol, also described below, as a function of the distance (in cm) from the right-hand fluorescent tube.

DETAILED DESCRIPTION OF THE INVENTION

Figure 1:
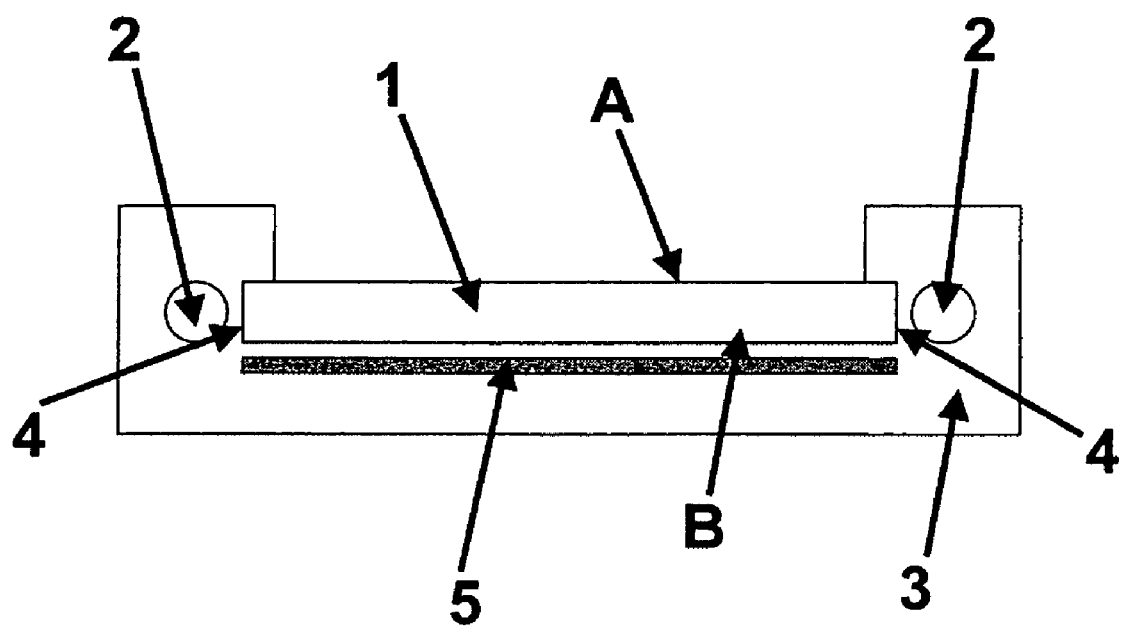
FIG. 1.

The light-scattering particles preferably have a mean size of 2 μm to 100 μm, and even more preferably from 10 to 50 μm.

The thermoplastic composition according to the invention preferably contains from 50 to 700 ppm and particularly from 100 to 500 ppm by weight of light-scattering particles. In the present text and unless otherwise indicated, the relative amounts of ingredients are indicated by percentages by weight.

The refractive index of the light-scattering particles preferably differs from that of the thermoplastic by at least ±0.1.

The composition according to the invention may also contain additives such as, for example, colorants, lubricants or UV stabilizers.

The (meth)acrylic thermoplastic (co)polymer may in particular consist of an alkyl (meth)acrylate homopolymer or else of a copolymer derived from an alkyl (meth)acrylate and at least one ethylenically unsaturated monomer copolymerizable with the alkyl (meth)acrylate. The term "(meth) acrylic" is understood to denote a derivative of acrylic or methacrylic acid, and the term "(meth)acrylate" is understood to mean an acrylate or methacrylate ester.

It is preferred to use a methacrylic thermoplastic (co) polymer.

As alkyl methacrylates, mention may especially be made of compounds in which the alkyl group has from 1 to 10 carbon atoms, for example, methyl, ethyl, propyl, isopropyl, butyl and isobornyl methacrylate.

One particular advantageous monomer is methyl methacrylate, the polymerization of which results in poly(methyl methacrylate) which, as thermoplastic polymer suitable for the invention, is particularly preferred, especially because of its advantageous optical properties.

The (meth)acrylic thermoplastic (co)polymer preferably comprises from 70 to 100% by weight of the main monomer (for example, alkyl methacrylate) and from 0 to 30% by weight of ethylenically unsaturated monomer(s) copolymerizable with the alkyl methacrylate. This (these) ethylenically unsaturated monomers are chosen, for example, from $C_1$–$C_{10}$ alkyl acrylates, styrene, substituted styrenes, acrylonitrile, methacrylonitrile, $C_1$–$C_{10}$ alkyl methacrylates different from the main monomer, hydroxyalkyl acrylates and methacrylates, alkoxyalkyl or aryloxyalkyl acrylates and methacrylates, in which the alkyl group has from 1 to 4 carbon atoms, acrylamide, methacrylamide, acrylic acid, methacrylic acid, maleimides and alkylene glycol dimethacrylates in which the alkylene group has from 1 to 4 carbon atoms.

The (meth)acrylic (co)polymers may be obtained by any known process, for example, by suspension polymerization, emulsion polymerization, mass polymerization, or solution polymerization in a solvent.

Preferably, the light-scattering particles consist only of hollow glass spheres.

A variety of hollow glass spheres is commercially available. For example, spheres known by the name Scotchlite® are sold by Minnesota Mining and Manufacturing Company (3M), St Paul, Minn., USA. These spheres are obtained by known processes. According to EP 1 172 341, it is possible, for example, to add an inflammable liquid to a mixture containing ingredients suitable for preparing the glass and a blowing agent, and then to subject the entire composition to a wet grinding operation so as to obtain a dispersion of particles having a mean size of 3 μm. This slurry is then atomized by means of a two-fluid nozzle, at a pressure of between 0.2 and 2 MPa, so as to form droplets. Heating these droplets results in the formation of hollow glass spheres or microspheres. As ingredients suitable for preparing the glass, mention may be made of silica sand, volcanic ash, perlite, obsidian, silica gel, zeolite, bentonite, borax, boric acid, $Ca_3(PO)_4$, $Na_2SO_4$, $Ma_4P_2O_7$, $Al_2O_3$, a compound deriving from $SiO_2$, $B_2O_3$ or $Na_2O$. It is preferred to use a borosilicate-based glass, especially soda-lime borosilicate glass. The blowing agent generates gas when the mixture of ingredients resulting in the glass undergoes vitrification by heating and has the effect of producing approximately spherical and hollow particles of melted and vitrified glass. The blowing agent may, for example, be sodium, potassium, lithium, calcium, magnesium, barium, aluminium or zinc sulphate, carbonate, nitrate or acetate.

The light-scattering particles may also consist of a mixture comprising:
particles of hollow glass spheres; and
particles of a mineral compound, such as titanium dioxide, barium sulphate and zinc oxide; and/or
particles of an organic compound, such as crosslinked polystyrene, poly(tetrafluoroethylene) or particles having a multilayer, for example two-layer, structure formed with at least one crosslinked polystyrene core.

The composition according to the invention may be obtained by melt-blending the thermoplastic (for example in granule form) with particles of scattering material (hollow glass spheres and, optionally particles of a mineral and/or organic compound) and optionally the other additives, such as colorants, lubricants or UV stabilizers. In general, these particles and additives are compounded with the thermoplastic in the form of a masterbatch. This compound may be produced in any suitable device.

The subject of the present invention is also a fashioned light-scattering article which can be manufactured from the thermoplastic composition described above by various known forming processes, in particular by extrusion, injection moulding, compression moulding or casting. Sheet products and moulded products of varied shape are then obtained.

The composition according to the invention is particularly suitable for manufacturing articles, especially sheets, by extrusion. This is because, in order for the fashioned article to have scattering properties, the composition from which it is manufactured must contain particles whose approximately spherical shape is not modified at the temperature used for the extrusion. The composition according to the invention, which contains particles of hollow glass spheres, is particularly suitable since these particles have a high melting point (about 1200° C.). This is also the case with compositions comprising a mixture of particles as described above, particularly one based on hollow glass spheres and poly(tetrafluoroethylene).

The fashioned articles may also be obtained directly in the form of sheets by mass polymerization of a mixture of (meth)acrylic monomers and optionally of their prepolymer, in the presence of light-scattering particles (hollow glass spheres and optionally particles of a mineral and/or organic compound) and other optional additives, in a mould formed by two glass plates (casting process).

For this mass polymerization, it is possible to use any known free radical initiator, for example diazo compounds such as azobis(isobutyronitrile) (AIBN) and peroxides such as benzoyl peroxide. The copolymerization generally takes place in the presence of a chain transfer agent, such as di-unsaturated monocyclic terpenes and monounsaturated dicyclic terpenes such as terpinolene, and mercaptans such as tert-dodecyl mercaptan. It is also possible to add agents which help to release the sheets from the mould, for example stearic acid and sodium dioctylsulphosuccinate, in the amount normally used.

The sheets, obtained from the compositions according to the invention, may have various thicknesses depending on the envisaged use, and especially from 3 mm to 25 mm. For advertisement luminous display systems, the thickness is generally from 8 to 20 mm.

Extrusion is a suitable process for manufacturing articles (for example sheets) having the thickness indicted above, and in particular, of small thickness. The process of extrusion provides a low tolerance on the thickness compared with other manufacturing processes. This guarantees reproducibility of the sheets, and therefore of the emitted light intensity, and makes it easier for the sheets to be mounted in frames to precise dimensions. This type of specification is particularly required in the production of flat light screens.

The subject of the invention is also a light-scattering panel which comprises a substrate made of a transparent thermoplastic formed from a (meth)acrylic (co)polymer and a scattering layer formed from a composition according to the invention, which layer is placed on one or both faces of the substrate. This product may be obtained by any suitable process, for example by coextrusion or by the hot juxtaposition of two sheets by simple adhesion (also called lamination). In this embodiment, the substrate may have a thickness of 2 to 25 mm and the scattering layer or layers a thickness of 20 to 1000 μm.

The sheets obtained from the compositions according to the invention may be used in any luminous display system, and especially that described in Patent Application EP-A-0 893 481.

According to a preferred variant of the invention, the fashioned articles described above are light-scattering sheets having a thickness of between 3 and 15 mm, preferably between 4 and 12 mm, and even more preferably between 6 and 10 mm. These sheets are suitable for the production of backlight units for assembling flat screens of microcomputers. Advantageously, these sheets are manufactured by forming the thermoplastic composition according to the invention by extrusion.

Finally, the subject of the invention is a backlight unit suitable for assembling the flat screens of microcomputers, comprising:

a light-scattering sheet according to the invention;
one or more light sources placed near one or more edges of the said sheet, so as to illuminate the latter via one or more edges; and
a frame in which the sheet and the light source(s) are mounted.

According to a preferred variant of the invention, a number of fluorescent tubes, for example two or an even number greater than two, are used as light source, the said tubes being placed (possibly in pairs) parallel to those edges of the sheet which correspond to the two opposed sides.

EXAMPLES

The following examples are given purely as an illustration of the composition and of the light-scattering panels according to the invention and should not be used to limit the scope thereof. In these examples, the following abbreviations are used:

PMMA: poly(methyl methacrylate)
PTFE: polytetrafluoroethylene
PS: polystyrene (crosslinked).

The properties of the light-scattering panels (or sheets) exemplified below were evaluated according to the following test protocol.

Scattered Light Intensity Test Protocol:

The sheets manufactured from the composition illustrated in the examples were firstly cut to a rectangular shape of 31.4 cm by 23.9 cm. They were then tested in the device, shown in FIG. 1, representative of a backlight unit.

The light sources were LTM 150XH cold-cathode fluorescent tubes 23.9 cm in length, sold by Harrison. Each of the two fluorescent tubes was placed in a white section having a 6 mm lip into which the short side of the sheet was also inserted. In this way, the light emitted by each tube was directed exclusively onto the edge of the sheet.

The scattered light intensity (expressed in lux) was measured perpendicular to the sheet by means of a light meter, the cell of which was placed on an axis parallel to the length of the sheet and at various distances, of 4, 8, 12, 16 and 20 cm, from the fluorescent tube on the right (for an observer looking at the scattered light).

Example 1

Thermoplastic Composition Comprising PMMA and 170 ppm of Hollow Glass Spheres

PMMA in bead form, sold by Atoglas under the name OROGLAS®9EL (sheet-extrusion grade) was used. The hollow glass spheres used had a mean diameter of 20 μm and a refractive index of about 1 (product sold by 3M under the name SCOTCHLITE® K20. As a reminder, the refractive index of PMMA is 1.498.

0.85% of a masterbatch consisting of 2% of hollow glass spheres was introduced into a single-screw extruder containing PMMA. The system was heated to a temperature of between 220 and 240° C.

This compound was then extruded in order to form a rectangular sheet having the dimensions of 2000 mm×3000 mm×6 mm, which was then cut to the desired shape.

The sheet, 31.4 cm in length and 23.9 cm in width, was then tested according to the test protocol described above.

The light intensity values indicated in Table 1 below, and shown graphically by the curve in FIG. 2 identified as "Example 1", were obtained.

This curve corresponds to a high level of light intensity (greater than 2000 lux) which is substantially uniform from one edge of the sheet to the other. In the central region of the sheet, the reduction in intensity is relatively limited.

Example 2 (Comparative)

Thermoplastic Composition Comprising PMMA and 810 ppm of PTFE

The same PMMA as in Example 1 was used. The PTFE particles had a mean diameter of 11 µm (product sold by DuPont de Nemours under the name "ZONYL® 1000). As a reminder, the refractive index of PTFE is 1.376.

The PTFE particles were incorporated into the PMMA using the procedure as in Example 1, in an amount of 5.4% of a masterbatch containing 1.5% of PTFE. Extruded sheets of the same dimensions were also obtained in the same way.

Figure 2:
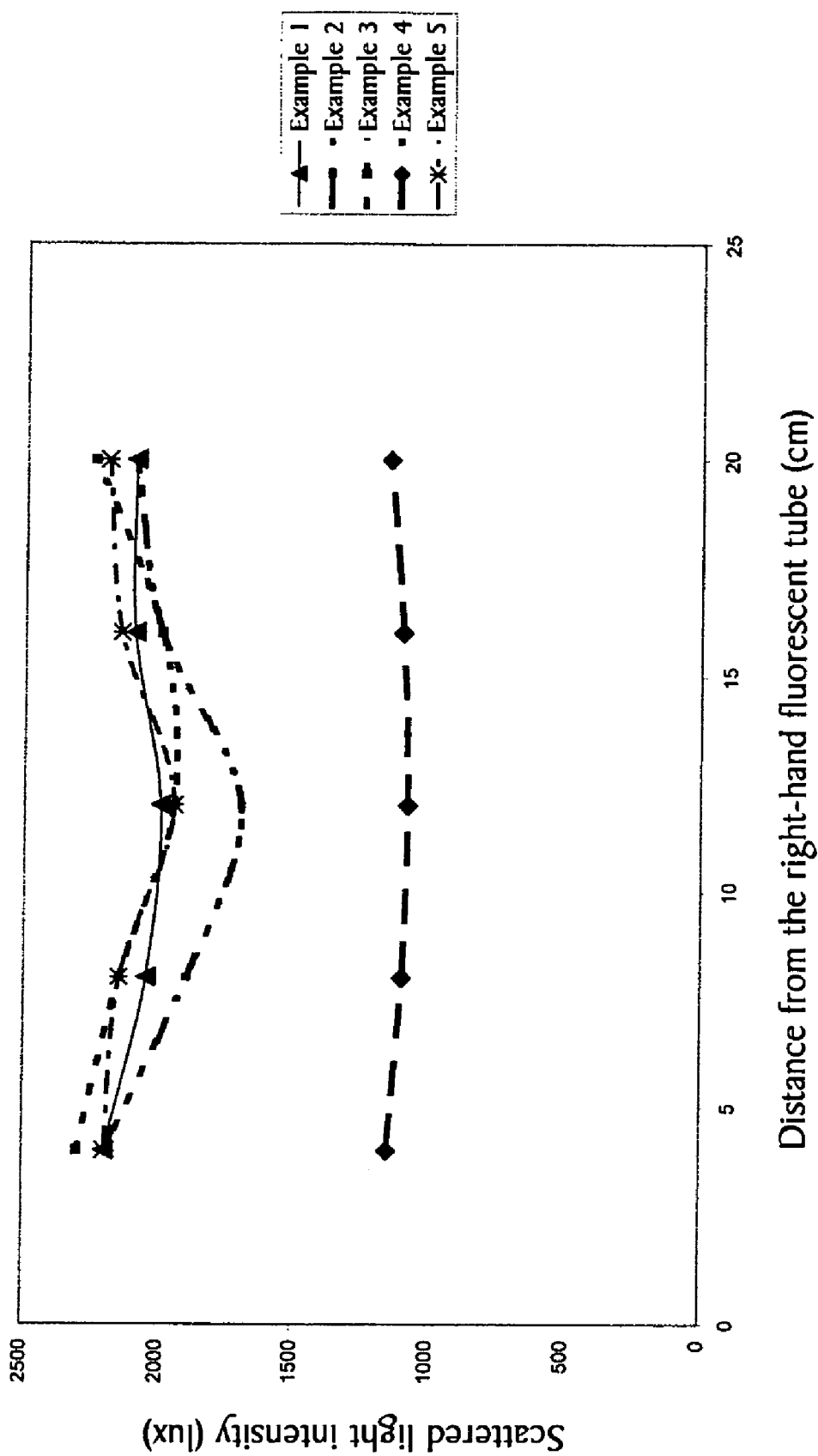
FIG. 2.

Implementation of the test protocol resulted in the light intensity values indicated in Table 1, corresponding to the curve in FIG. 2 identified as "Example 2".

This curve corresponds to a high light intensity near the edges of the scattering sheet, of the same level as in Example 1. However, the light intensity is highly non-uniform, exhibiting a drop of about 15% in the central region of the sheet compared with this same Example 1.

Example 3

Thermoplastic Composition Comprising PMMA and 200 ppm of Hollow Glass Spheres

Example 1 was repeated, introducing 1% of a masterbatch containing 2% of hollow glass spheres.

The light intensity values are indicated in Table 1, and the corresponding curve is plotted in FIG. 2.

This curve shows a slightly improved light intensity level compared with Example 1, while providing satisfactory uniformity over the entire sheet.

Example 4 (Comparative)

Thermoplastic Composition Comprising PMMA and 200 ppm of PTFE

Example 2 was repeated, introducing 1% of the masterbatch containing 2% of PTFE particles.

The light intensity values are indicated in Table 1 and the corresponding curve is plotted in FIG. 2.

This curve shows a remarkably uniform light intensity over the entire sheet, but this intensity, in a range of about 1200 lux, lies at a level very much below that suitable for use in a backlight unit.

Example 5

Thermoplastic Composition Comprising PMMA and a Mixture of 100 ppm of Hollow Glass Spheres and 400 ppm of PS As PMMA and hollow glass spheres, the same materials as in the preceding examples were used. Spherical crosslinked PS particles having a mean diameter of 6 µm and sold by SEKISUI under the name "PS grade SBX-6" were used. The refractive index of PS is 1.592.

A composition according to the invention was manufactured using the procedure as in Example 1, except that 2% of a masterbatch based on PMMA containing 5000 ppm of hollow glass spheres and 2% of PS was introduced into the PMMA placed in the single-screw extruder.

After extrusion under the same conditions as in the previous examples, the test protocol was implemented; the values of the scattered light intensity are indicated in Table 1, and the corresponding curve is plotted in FIG. 2.

This curve shows a light intensity slightly higher than that of Example 1, which thus corresponds to a quite excellent light transmission efficiency, except in the central part of the sheet, where however, it remains very similar.

TABLE 1

| Distance (cm) | Scattered light intensity (in lux) | | | | |
|---|---|---|---|---|---|
| | Example 1 | Example 2 | Example 3 | Example 4 | Example 5 |
| 4 | 2200 | 2200 | 2300 | 1150 | 2200 |
| 8 | 2050 | 1900 | 2150 | 1100 | 2150 |
| 12 | 2000 | 1700 | 1950 | 1080 | 1950 |
| 16 | 2100 | 2000 | 2000 | 1100 | 2150 |
| 20 | 2100 | 2100 | 2250 | 1150 | 2200 |

The invention claimed is:

1. Thermoplastic composition for fashioned light-scattering articles comprising:
   a) a transparent thermoplastic made from a (meth)acrylic
   b) (co)polymer; and
   b) light-scattering particles,
   said composition being characterized in that it comprises, as light-scattering particles, particles of hollow glass spheres, or a mixture of particles of hollow glass spheres and particles of a mineral and/or organic compound, wherein said light-scattering particles:
   have a mean size of 0.5 µm to 200 µm;
   possess a refractive index different from that of the transparent thermoplastic by at least ±0.05; and
   comprise 5 ppm to 1000 ppm by weight of the total composition.

2. Thermoplastic composition according to claim 1, characterized in that the light-scattering particles have a mean size of 2 µM to 100 µm.

3. Thermoplastic composition according to claim 1, characterized in that it contains from 50 to 700 ppm by weight of light-scattering particles.

4. Thermoplastic composition according to claim 1, characterized in that the refractive index of the light-scattering particles differs from that of the thermoplastic by at least ±0.1.

5. Thermoplastic composition according to claim 1, characterized in that the (meth)acrylic (co)polymer is chosen from an alkyl (meth)acrylate homopolymer or a copolymer derived from an alkyl (meth)acrylate and at least one ethylenically unsaturated monomer copolymerizable with the alkyl (meth)acrylate.

6. Thermoplastic composition according to claim 5, characterized in that the alkyl (meth)acrylate is methyl methacrylate.

7. Thermoplastic composition according to claim 5, characterized in that the (meth)acrylic thermoplastic (co)polymer comprises:
   from 70 to 100% by weight of the alkyl (meth)acrylate, as main monomer, and
   from 0 to 30% by weight of ethylenically unsaturated monomer(s) copolymerizable with the alkyl methacrylate.

8. Thermoplastic composition according to claim 7, characterized in that the ethylenically unsaturated monomers are chosen from $C_1$–$C_{10}$ alkyl acrylates, styrene, substituted styrenes, acrylonitrile, methacrylonitrile, $C_1$–$C_{10}$ alkyl methacrylates different from the main monomer, hydroxyalkyl acrylates and methacrylates, alkoxyalkyl or aryloxyalkyl acrylates and methacrylates, in which the alkyl group has from 1 to 4 carbon atoms, acrylamide, methacrylamide, acrylic acid, methacrylic acid, maleimides and alkylene glycol dimethacrylates in which the alkylene group has from 1 to 4 carbon atoms.

9. Thermoplastic composition according to claim 1, characterized in that the light-scattering particles consist only of hollow glass spheres.

10. Thermoplastic composition according to claim 1, characterized in that the light-scattering particles consist of a mixture comprising:
   particles of hollow glass spheres; and
   particles of a mineral compound, chosen from titanium dioxide, barium sulphate and zinc oxide; and/or
   particles of an organic compound chosen from crosslinked polystyrene, poly(tetrafluoroethylene) or particles having a multilayer, for example two-layer, structure formed with at least one crosslinked polystyrene core.

11. Fashioned light-scattering article manufactured from the thermoplastic composition as defined in claim 1, by forming it by extrusion, injection moulding, compression moulding or casting.

12. Fashioned article according to claim 11 in sheet form.

13. Fashioned article according to claim 12, characterized in that the sheet has a thickness of between 3 mm and 25 mm.

14. Light-scattering panel, comprising a substrate made of a transparent thermoplastic formed from a (meth)acrylic (co)polymer and a scattering layer formed from a composition according to claim 1, the said layer being placed on one or both faces of the substrate.

15. Panel according to claim 14, characterized in that it is obtained by coextrusion or lamination.

16. Panel according to claim 14, characterized in that the substrate has a thickness of 2 to 25 mm and the scattering layer(s) a thickness of 20 to 1000 µm.

17. Fashioned article according to claim 12, characterized in that the sheet has a thickness of between 3 and 15 mm, preferably between 4 and 12 mm, and even more preferably between 6 and 10 mm.

18. Backlight unit suitable for assembling the flat screens of microcomputers, comprising:
   a light-scattering sheet of claim 12;
   one or more light sources placed near one or more edges of the said sheet, so as to illuminate the latter via one or more edges; and
   a frame in which the sheet and the light source(s) are mounted.

19. Backlight unit according to claim 18, characterized in that a number of fluorescent tubes, for example two or an even number greater than two, are used as light source, the said tubes being placed, possibly in pairs, parallel to those edges of the sheet which correspond to the two opposed sides.

20. Thermoplastic composition according to claim 2, characterized in that the light-scattering particles have a mean size of 10 to 50 µM.

21. Thermoplastic composition according to claim 3, characterized in that it contains from 100 to 500 ppm by weight of light-scattering particles.

\* \* \* \* \*